Aug. 20, 1946.   L. BARBER   2,406,055
FRUIT PICKER
Filed Dec. 4, 1943   2 Sheets-Sheet 1
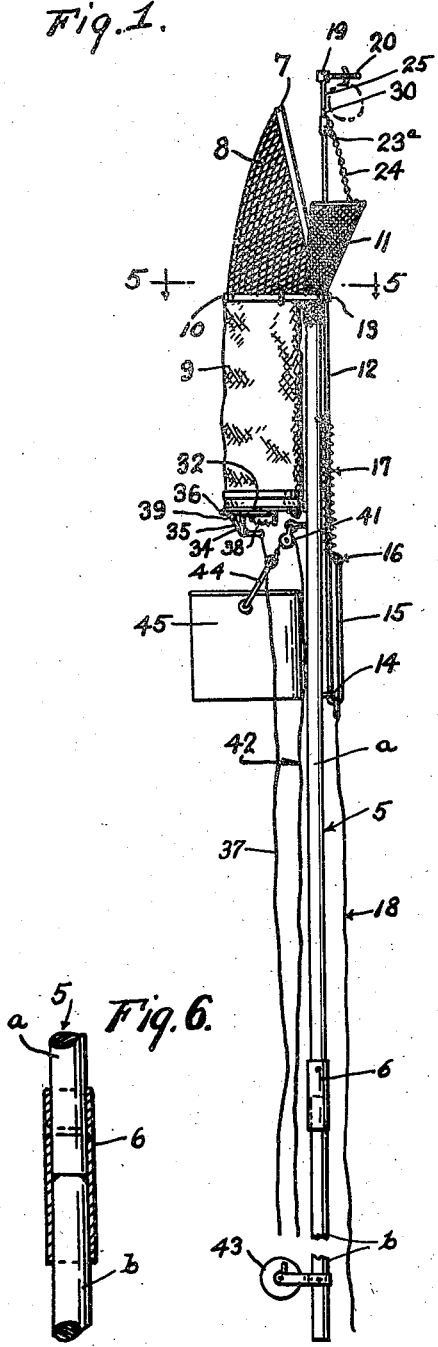
Inventor
Lonnie Barber
By Clarence A. O'Brien
and Harvey B. Jacobson
Attorneys Aug. 20, 1946.  L. BARBER  2,406,055
FRUIT PICKER
Filed Dec. 4, 1943  2 Sheets-Sheet 2
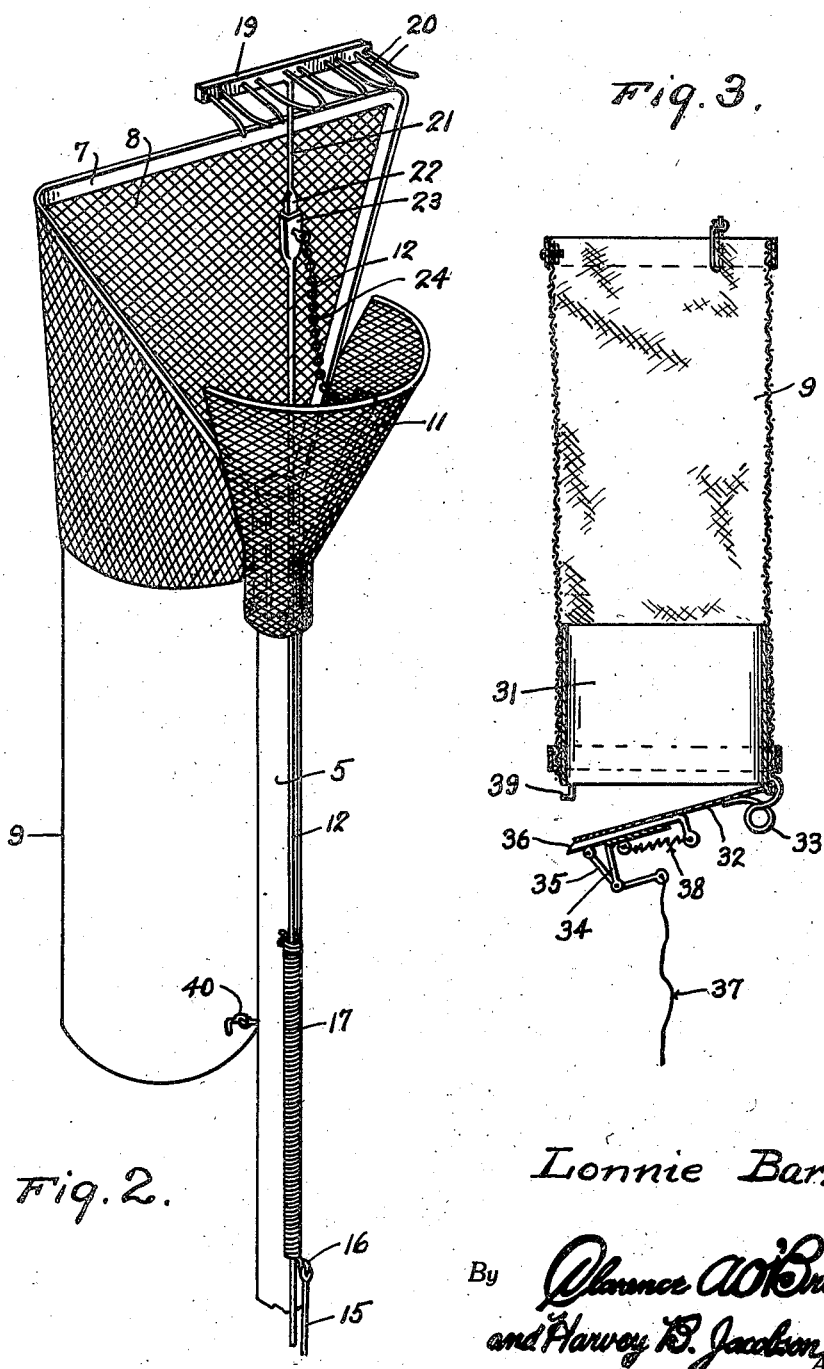
Inventor
Lonnie Barber
By Clarence A. O'Brien
and Harvey B. Jacobson
Attorneys Patented Aug. 20, 1946

2,406,055

UNITED STATES PATENT OFFICE 2,406,055

FRUIT PICKER

Lonnie Barber, Danville, Va., assignor of twenty per cent to Dubose Younger and twenty per cent to William Glaise, both of Danville, Va.

Application December 4, 1943, Serial No. 512,925

1 Claim. (Cl. 56—340)

This invention relates to new and useful improvements in fruit pickers whereby a person gathering fruit can pick fruit from fruit trees in an efficient and convenient manner without mounting a ladder or climbing trees.

The principal object of the present invention is to provide a special pole and receptacle assembly involving novel improvements over prior devices of this nature whereby considerably more pieces of fruit can be picked and with less likelihood of damage thereto.

Other objects and advantages of the invention will become apparent to the reader of the following description.

In the drawings:

Figure 1 represents a side elevational view of the picker.

Figure 2 is a fragmentary perspective view showing the upper portion with the clamping ring being removed.

Figure 3 is a vertical sectional view through the bag showing the bottom closure in partly opened position.

Figure 4 is a fragmentary perspective view of a modified form of picker element.

Figure 5 is a section on the line 5—5 of Figure 1.

Figure 6 is a fragmentary sectional view through the coupling means of the pole.

Referring to the drawings wherein like numerals designate like parts, it can be seen that numeral 5 denotes an elongated pole divided into sections $a$, $b$ but coupled by a sleeve 6, as shown in Figure 6.

A substantially triangular-shaped frame 7 rises from the upper portion of the pole 5 and supports the upper portion of a mesh fruit chute 8, the lower end portion of which extends into a fabric bag 9, which depends along the upper portion of the pole 5 as shown in Figure 1. A clamp band 10 serves to hold the bag in place. A half funnel-shaped guide 11 is provided at the opposite side of the upper end of the pole 5 from chute 8 and is somewhat shorter than the chute 8.

A pull rod 12 slidably disposed through suitable guides 13, 14 has its lower end, below the guide 14, bent upwardly as at 15 and formed with an eye 16. On the rod 12 is a coiled tension spring 17, the upper end of which is anchored to the pole 5, while the lower end connects to the eye 16 of the backwardly bent portion 15 of the rod 12. A pull line 18 extends downwardly from the lower end of the rod 12.

A puller element is provided at the upper end of the rod 12, this element being shown in Figure 2 and consists of a cross bar 19 having a plurality of outwardly flaring fingers 20 thereon, which of course can straddle a fruit stem so that by pulling downwardly on the picker element the fruit can be broken loose from its stem. Numeral 21 denotes a short shank provided with a head 22 which is adapted to be wedged into a socket 23 on the upper end of the rod 12, and a chain or like element 24 is connected between the socket 23 and the upper edge of the guide 11 for the purpose of limiting upward movement of the picker element.

A modification of the picker element is shown in Figure 4 wherein a rod 25 is provided with a laterally disposed portion 26 at its upper end which is then extended in a diverged direction as at 27, the portion 26 being shorter than the portion 27, and the portion 27 being provided with a curved free end 28. Where the portion 26 merges with the portion 27 a narrow extension 29 is provided into which a fruit stem can be received. The lower end of the rod 25 has a head 30 for disposition into a socket 23a corresponding to the socket 23 in Figure 2.

A metal sleeve or the like 31 is provided in the lower portion of the bag 9 and the lower end of this sleeve has a swingable bottom 32 normally closed by a spring 33.

A detent is provided for this closure 32 and the same consists of a bracket 34 depending from the closure 32 and having a bellcrank 35 mounted thereon, one end of which is engaged with a latch 36 while the other end has a pull cord 37 depending therefrom. A spring 38 is employed in conjunction with the latch 36 to normally maintain the same in a projected position with respect to a keeper 39 on the sleeve 31.

An element 40 on the pole 5 supports a pulley 41 over which is trained a line 42 from a reel 43 on the lower portion of the lower section $b$ of the pole 5. This line 42 extends over the pulley 41 to the bail 44 of a bucket 45.

It can now be seen, that by pulling on the line 18 after engaging the picker element with the fruit on a tree, the fruit can be picked off and will fall into the chute 8 after being guided by the guide 11 and eventually come to rest in the bag 9. When the bag is full, it is not necessary to lower the entire device, as a pull on the line 37 will release the fruit into the bucket 45. The bucket 45 can then be lowered by the use of the reel 43, emptied and elevated to the position shown in Figure 1.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A fruit picking device, comprising, a pole, a funnel-shaped chute carried by one end of said pole, sloping at its top, inwardly and downwardly in a plane disposed at an acute angle to the axis of the pole, a half-conical guide also carried by the end of said pole, and open at its top and along a side confronting the opening in the chute, a container carried by the chute and into which fruit from the chute is received, said container being open at its bottom, a movable closure at the bottom of the container, a guide on said pole, a rod carried by said pole and extending longitudinally thereof through said guide and slidable along said pole, a picking element at the end of the rod adjacent said chute, a spring, operatively engaging the rod and pole to maintain the picker in extended position and operating means connected to the rod.

LONNIE BARBER.